US012665125B2

(12) United States Patent
Mo et al.

(10) Patent No.: US 12,665,125 B2
(45) Date of Patent: Jun. 23, 2026

(54) COIL, PLANAR COIL AND METHOD FOR MAKING COIL

(71) Applicant: 3M INNOVATIVE PROPERTIES COMPANY, St. Paul, MN (US)

(72) Inventors: Sang-jun Mo, Hwaseong-si (KR); Seong-Woo Woo, Gwangju-si (KR); Jinwook Kim, Hwaseong-si (KR)

(73) Assignee: 3M Innovative Properties Company, St. Paul, MN (US)

(*) Notice: Subject to any disclaimer, the term of this patent is extended or adjusted under 35 U.S.C. 154(b) by 908 days.

(21) Appl. No.: 17/870,217

(22) Filed: Jul. 21, 2022

(65) Prior Publication Data

US 2023/0035952 A1 Feb. 2, 2023

(30) Foreign Application Priority Data

Jul. 29, 2021 (KR) ........................ 10-2021-0099562

(51) Int. Cl.

*H01F 5/00* (2006.01)
*H01F 1/34* (2006.01)
*H01F 27/32* (2006.01)
*H01F 41/063* (2016.01)

(52) U.S. Cl.

CPC ............ *H01F 27/323* (2013.01); *H01F 1/34* (2013.01); *H01F 41/063* (2016.01)

(58) Field of Classification Search

CPC ..................................................... H01F 27/323
USPC .......................................................... 336/200
See application file for complete search history.

(56) References Cited

U.S. PATENT DOCUMENTS

| | | | | |
|---|---|---|---|---|
| 9,712,209 | B2 | 7/2017 | Kim et al. | |
| 2013/0049917 | A1* | 2/2013 | Kim | H01F 41/041 336/200 |
| 2018/0082775 | A1* | 3/2018 | Shimoichi | H01F 27/327 |

FOREIGN PATENT DOCUMENTS

| | | | |
|---|---|---|---|
| KR | 101491472 | B1 | 2/2015 |
| WO | 2020044203 | A1 | 3/2020 |

* cited by examiner

*Primary Examiner* — Ronald Hinson
(74) *Attorney, Agent, or Firm* — Gregg H. Rosenblatt

(57) ABSTRACT

The disclosure relates to a coil, a planar coil, and a method for making a coil. Specifically, according to an embodiment of the disclosure, a coil includes: main coil surfaces which are opposite each other and are substantially planar; and a multilayer film which is wound to form a plurality of loops which are substantially concentric, and the plurality of loops include an innermost loop including a first longitudinal direction end of the coil, and an outermost loop including a second longitudinal direction end of the coil, and the multilayer film includes a plurality of first electro-conductive layers which alternate with each other, and one or more second electrical insulation layer.

16 Claims, 4 Drawing Sheets

COIL, PLANAR COIL AND METHOD FOR MAKING COIL

TECHNICAL FIELD

The disclosure relates to a coil, a planar coil, and a method for making a coil.

BACKGROUND

A portable electronic device having a battery embedded therein, such as a smartphone, a personal digital assistant (PDA), a tablet, or the like, needs to be charged with power. Recently, a system for wirelessly transmitting power is increasingly used to charge a battery embedded in a portable electronic device, etc. Such a wireless charging system (wireless power charging (WPC)) may transmit and receive power by using electromagnetic induction or resonance, and to achieve this, a coil is provided in an electronic device and a wireless charging system.

In addition, a portable electronic device may provide various functions such as a short-range wireless communication system (near field communication (NFC)) and a wireless electronic payment system (magnetic secure transmission (MST)) as well as a wireless charging system. In particular, the portable electronic device may be provided with a plurality of coils in the electronic device in order to perform the short-range wireless communication and the wireless electronic payment system.

As described above, the portable electronic device may have a plurality of coils installed therein to perform the wireless charging system, the short-range wireless communication system, and the wireless electronic payment system independently.

SUMMARY

Technical Problem

Such a coil may be formed by winding a copper sheet multiple times and then cutting the copper sheet wound multiple times. In addition, a shape of the coil may be determined according to a shape of the wound copper sheet. For example, when the copper sheet is wound around a circular elongated rod, the shape of the cut coil may be circular. The shape of the coil may need to be deformed according to circumstances. Accordingly, in order to make various coils having different shapes and sizes, various elongated rods corresponding to the coils may be required.

However, in the case of an oval coil, it may be difficult to precisely wind a copper sheet around an oval elongated rod, and, once the copper sheet is cured, it may be difficult to change a geometrical shape.

An embodiment of the disclosure has been invented based on the above-described background, and provides coils of various shapes and a method for easily making such a coil.

Technical Solution

According to an aspect of the disclosure, there is provided a coil including: main coil surfaces which are opposite each other and are substantially planar; and a multilayer film which is wound to form a plurality of loops which are substantially concentric, wherein the plurality of loops include an innermost loop including a first longitudinal direction end of the coil, and an outermost loop including a second longitudinal direction end of the coil, wherein the multilayer film includes a plurality of first electro-conductive layers which alternate with each other, and one or more second electrical insulation layers, wherein the first electro-conductive layer and the second electrical insulation layer have a length which is substantially coextensive therebetween along a winding direction of the coil, and have a width which is substantially coextensive along a thickness direction of the coil, such that the main coil surfaces, which are substantially planar, include corresponding end surfaces of the first electro-conductive layer and the second electrical insulation layer, respectively, wherein the multilayer film has respective average widths W1, W2 along a first in-plane direction and a second in-plane direction of one or more of the main coil surfaces which are planar, wherein the first in-plane direction and the second in-plane direction have an angle between about 5° and about 175° therebetween, wherein a ratio of the average width W1 of the multilayer film in the first in-plane direction to the average width W2 of the multilayer film in the second in-plane direction (W1/W2) is 1.03-2 inclusive.

In addition, there is provided a coil including a multilayer film which is wound to form a plurality of loops which are substantially concentric, wherein the multilayer film includes a plurality of first electro-conductive layers which are spaced apart from one another in a thickness direction of the multilayer film, and a second adhesive layer, wherein two or more adjacent first electro-conductive layers are spaced apart from each other by the second adhesive layer, wherein the first electro-conductive layer and the second adhesive layer have a length which is substantially coextensive therebetween along a winding direction of the coil, and have a width which is substantially coextensive along a thickness direction of the coil, such that corresponding end surfaces of the first electro-conductive layer and the second adhesive layer define main coil surfaces of the coil which are opposite each other and are substantially planar, wherein, when the coil is evenly placed, the coil has a center substantially placed on a coil axis which forms an angle between 30° and 89° with one or more of the main coil surfaces which are planar.

Advantageous Effects

In an embodiment of the disclosure, there is an effect that coils of various shapes are easily made.

In addition, in an embodiment of the disclosure, the plurality of loops have different thicknesses, such that a coil of a low impedance can be made.

In addition, a coil having a thick thickness can be made without winding a thick copper sheet, and there is an effect that a process can be simplified.

DETAILED DESCRIPTION

Hereinafter, specific embodiments for implementing the technical concept of the disclosure will be described in detail with reference to the accompanying drawings.

In the description of the disclosure, detailed explanations of related-art configurations or functions are omitted when it is deemed that they may unnecessarily obscure the essence of the disclosure.

In addition, it will be understood that, when a certain element is referred to as 'being connected to,' 'contacting' another element, the element may be directly connected to, contact another element, or there may be an intervening element therebetween.

The terms used in the detailed descriptions are used for the purpose of describing particular embodiments only and are not intended to limit the disclosure. The singular forms include the plural forms as well unless the context clearly indicates otherwise.

In addition, it is noted that the expressions "upper side," "side surface" used in the detailed descriptions are explained with reference to the illustrations of the drawings, and, when a direction of a corresponding object is changed, different expressions may be used. For the same reasons, some elements in the accompanying drawings may be exaggerated, omitted, or schematically illustrated, and a size of each element does not reflect a real size.

In addition, the terms including ordinal numbers such as first, second may be used to explain various elements, and corresponding elements are not limited by such terms.

These terms are used for the purpose of distinguishing one element from another element only.

The terms "includes," "comprise" used in the detailed descriptions are used to specify a specific characteristic, area, integer, step, operation, element, and/or component, and do not preclude the presence or addition of other specific characteristics, areas, integers, steps, operations, elements, components, and/or groups.

Figure 1:
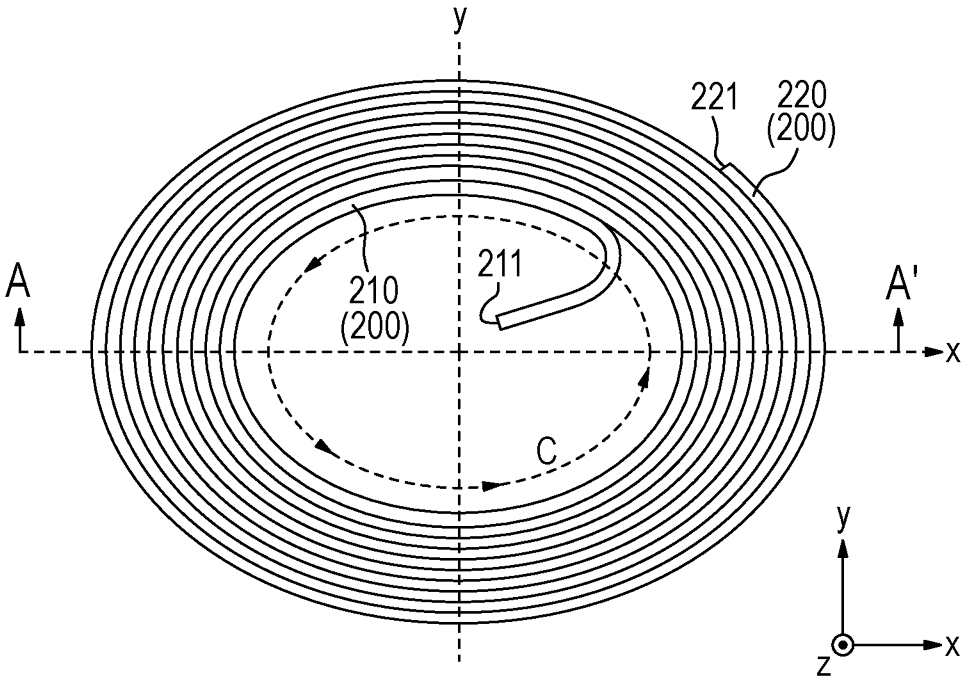
FIG. 1 is a top view of a coil according to a first embodiment of the disclosure.
Figure 2:
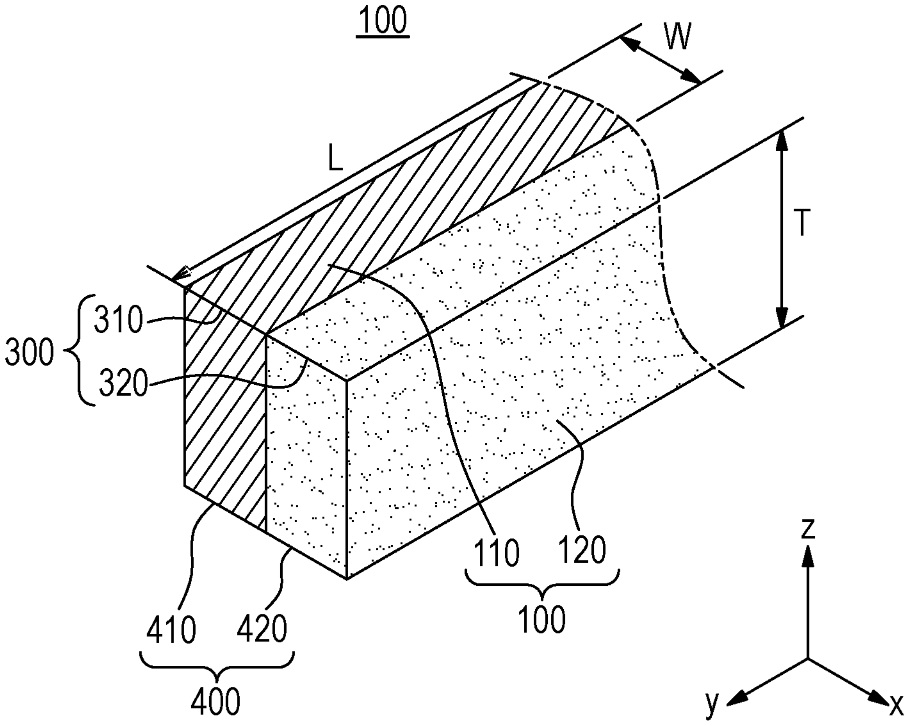
FIG. 2 is a perspective view illustrating a multilayer film in part according to the first embodiment of the disclosure.

In the detailed descriptions, a longitudinal direction may be a direction (c) in which a coil 1 of FIG. 1 is wound, and a y-axis direction of FIG. 2. In addition, a thickness direction may be a z-axis direction of FIGS. 2 and 3, and a width direction may be an x-axis direction of FIG. 2.

Hereinafter, a specific configuration of the coil 1 according to an embodiment of the disclosure will be described.

Referring to FIG. 1, the coil 1 according to an embodiment of the disclosure may provide a portion allowing a current to flow therethrough. In addition, the coil 1 may be installed in a portable electronic device such as a smartphone, a PDA, a tablet, or the like in order to provide various functions. For example, the coil 1 may be installed in the portable electronic device to provide one or more functions of a wireless charging system (wireless power charging (WPC)), a short-range wireless communication system (near field communication (NFC)), and a wireless electronic payment system (magnetic secure transmission (MST)). The coil 1 may include a multilayer film 100.

Figure 3:
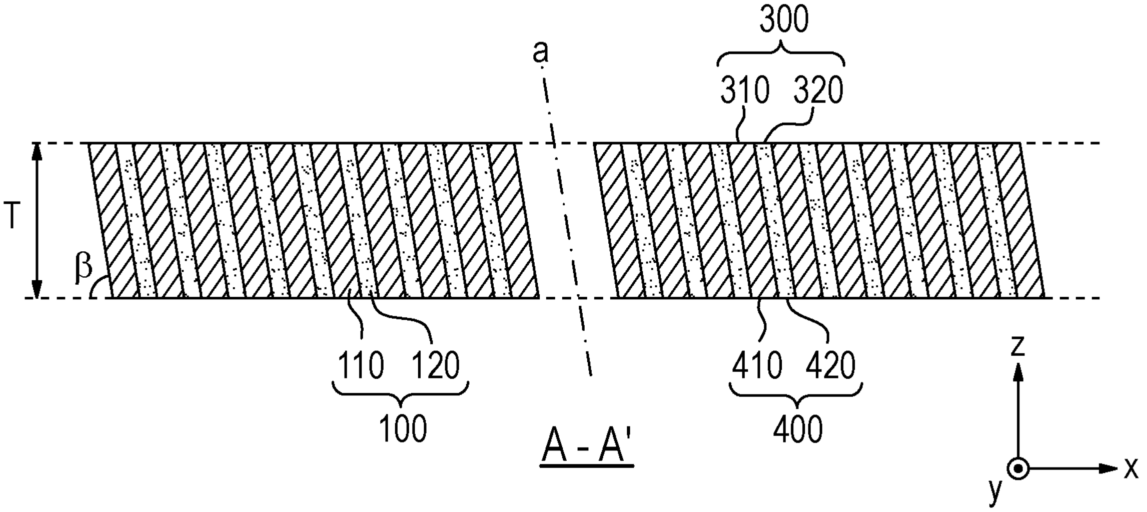
FIG. 3 is a cross-sectional view of the coil cut along line A-A' of FIG. 1.

Referring to FIGS. 2 and 3, the multilayer film 100 may have a multilayer structure and may include a conductive material through which a current flows. The multilayer film 100 may include a first electro-conductive layer 110 and a second electrical insulation layer 120.

The first electro-conductive layer 110 may include a metallic material which enables a current to flow therethrough. In addition, the first electro-conductive layer 110 may be magnetically insulative. The first electro-conductive layer 110 may be provided in plural number, and the plurality of first electro-conductive layers 110 may be arranged to alternate with each other. In addition, the second electrical insulation layer 120 may be disposed between two adjacent first electro-conductive layers 110. In the detailed descriptions, the first electro-conductive layer 110 may include metal, for example, copper.

One or more second electrical insulation layers 120 may be provided, and may connect two adjacent first electro-conductive layers 110. In addition, the second electrical insulation layer 120 may insulate between two adjacent first electro-conductive layers 110.

Referring back to FIG. 1, the coil 1 may be wound to form a plurality of loops 200 which are substantially concentric. In other words, the multilayer film 100 may be provided to form the plurality of loops 200 by winding a long film of a linear shape multiple times. In the detailed descriptions, the plurality of loops 200 being formed means that the multilayer film 100 is wound multiple times to enclose a predetermined center. In addition, the plurality of loops 200 may be a concept that includes not only loops having different centers, but also a plurality of loops having the same center. In addition, the plurality of loops 200 may be formed by separate coils, but may be formed in a connected shape by one coil. The plurality of loops 200 may include an innermost loop 210 and an outermost loop 220.

The innermost loop 210 may be a loop 200 that is disposed in the innermost area among the plurality of loops 200, and may include a first longitudinal direction end 211 which is an end at one side of the coil 1.

The outermost loop 220 may be a loop that is disposed in the outermost area among the plurality of loops 200, and may include a second longitudinal direction end 221 which is an end at the other side of the coil 1.

Herein, the first longitudinal direction end 211 refers to an end at one side of the multilayer film 100 in the longitudinal direction, and the second longitudinal direction end 221 refers to an end at the other side of the multilayer film 100 in the longitudinal direction. In addition, the longitudinal direction may be a direction in which the multilayer film 100 is extended.

Referring back to FIGS. 2 and 3, the coil 1 may include main coil surfaces 300, 400. The main coil surfaces 300, 400 may be extended between the first longitudinal direction end 211 and the second longitudinal direction end 221. In addition, the main coil surfaces 300, 400 may be opposite each other and may be substantially planar, and the coil 1 may be referred to as a planar coil 1. The main coil surfaces 300, 400 may be extended to be misaligned from each other by a predetermined angle. For example, the main coil surfaces 300, 400 may form an angle of 0°-10° inclusive with each other. The main coil surfaces 300, 400 may include a first main coil surface 300 which is one side surface of the multilayer film 100, and a second main coil surface 400 which is the other side surface of the multilayer film 100.

The first main coil surface 300 may include a first electro-conductive layer end surface 310 and a first electrical insulation layer end surface 320. The first main coil surface 300 may be referred to as a top main coil surface 300.

The second main coil surface 400 may include a second electro-conductive layer end surface 410 and a second electrical insulation layer end surface 420. The second main coil surface 400 may be referred to as a bottom main coil surface 400.

Herein, the first electro-conductive layer end surface 310 and the second electro-conductive layer end surface 410 refer to both side end surfaces of the first electro-conductive layer 110 in the thickness direction. In addition, the first electrical insulation layer end surface 320 and the second electrical insulation layer end surface 420 refer to both side end surfaces of the second electrical insulation layer 120 in the thickness direction.

The first main coil surface 300 and the second main coil surface 400 may include a first direction within a plane, and may be offset by each other, such that a cross section of the coil 1 cut along a plane perpendicular to the coil 1 has a parallelogrammic shape. Herein, the first main coil surface 300 and the second main coil surface 400 being offset means that they are spaced apart from each other. For example, on the cross section of the coil 1 having the parallelogrammic shape, two adjacent surfaces of the parallelogram may form an angle between about 10° and about 60°.

In the detailed descriptions, the first electro-conductive layer end surface 310, the first electrical insulation layer end surface 320, the second electro-conductive layer end surface 410, the second electrical insulation layer end surface 420 may be referred to as corresponding end surfaces 310, 320, 410, 420. In addition, the main coil surfaces 300, 400 may include the corresponding end surfaces 310, 320, 410, 420.

In addition, the first electro-conductive layer 110 and the second electrical insulation layer 120 may have a length L which is substantially coextensive therebetween along a winding direction of the coil 1, such that the first main coil surface 300 and the second main coil surface 400, which are substantially planar, include the corresponding end surfaces 310, 320, 410, 420 of the first electro-conductive layer 110 and the second electrical insulation layer 120, respectively. In other words, the first electro-conductive layer 110 and the second electrical insulation layer 120 may be extended to have the same length L along the winding direction of the coil 1.

In addition, the first electro-conductive layer 110 and the second electrical insulation layer 120 may have a thickness T which is substantially coextensive therebetween along the thickness direction of the coil 1, such that the first main coil surface 300 and the second main coil surface 400, which are substantially planar, include the corresponding end surfaces 310, 320, 410, 420 of the first electro-conductive layer 110 and the second electrical insulation layer 120, respectively. In other words, the first electro-conductive layer 110 and the second electrical insulation layer 120 may be extended to have the same thickness T along the thickness direction of the coil 1.

Figure 4:
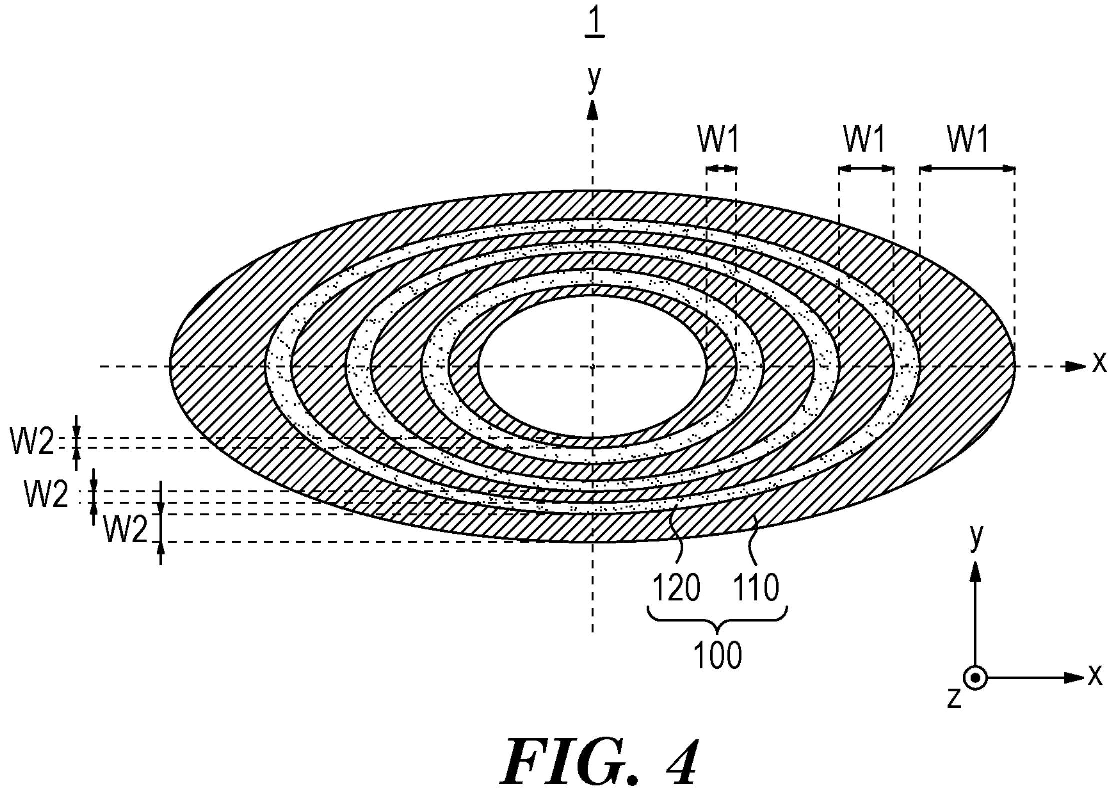
FIG. 4 is a view illustrating a first average width and a second average width of the coil of FIG. 1.

Referring to FIG. 4, the multilayer film 100 may have average widths W1, W2 with respect to a first in-plane direction and a second in-plane direction of one or more of the main coil surfaces 300, 400. In the detailed descriptions, the first in-plane direction refers to a direction that is extended in parallel with a direction in which any one of the main coil surfaces 300, 400 is extended. In addition, the second in-plane direction refers to a direction that is extended in parallel with the direction in which any one of the main coil surfaces 300, 400 is extended, and is extended in a different direction from the first in-plane direction. For example, the first in-plane direction may be the x-axis direction, and the second in-plane direction may be the y-axis direction. In this case, the first in-plane direction and the second in-plane direction may be perpendicular to each other.

In addition, the multilayer film 100 may have a first average width W1 in the first in-plane direction, and may have a second average width W2 in the second in-plane direction. Herein, the first average width W1 refers to an average of widths of the multilayer film 100 that is placed on a virtual line extended along the first in-plane direction. In addition, the second average width W2 refers to an average of widths of the multilayer film 100 that is placed on a virtual line extended along the second in-plane direction. For example, a ratio of the first average width W1 to the second average width W2 (W1/W2) may be 1.03-2 inclusive.

As described above, since the first average width W1 and the second average width W2 of the multilayer film 100 are different from each other, the coil 1 may have an oval shape when viewed from an upper side. Herein, the upper side refers to one side in the thickness direction. In addition, the coil 1 may have a parallelogrammic shape when viewed from a side surface. Herein, the side surface refers to one surface parallel to the ground.

Figure 5:
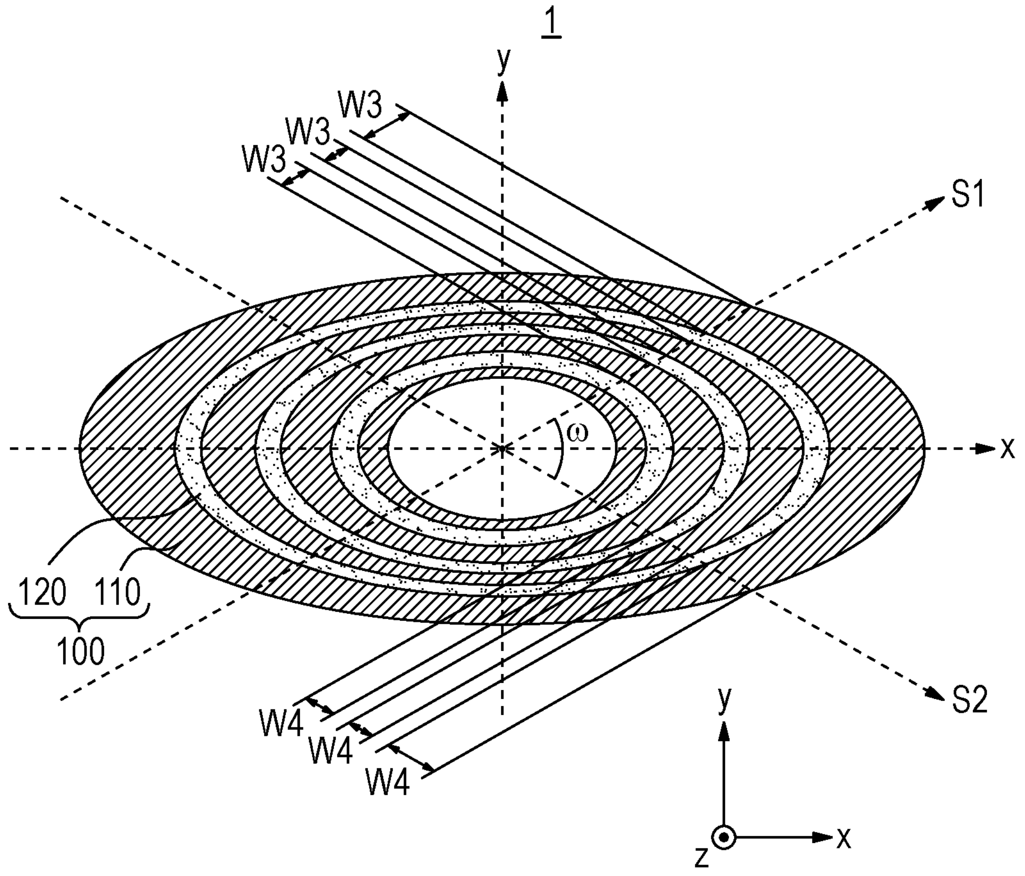
FIG. 5 is a view illustrating a third average width and a fourth average width of the coil of FIG. 1.

Referring to FIG. 5, the multilayer film 100 may have average widths W3, W4 along two or more directions. In other words, the multilayer film 100 may have average widths W3, W4 with respect to a first axis direction S1 and a second axis direction S2, respectively. Herein, the first axis direction S1 and the second axis direction S2 may be certain axis directions which are extended on the same plane in different directions. For example, the first axis direction S1 and the second axis direction S2 may be extended to have an angle ω between about 20° and 160° therebetween. In a more specific example, the first axis direction S1 and the second axis direction S2 may be extended to have an angle between about 85° and 95° therebetween.

In addition, the multilayer film 100 may have a third average width W3 in the first axis direction S1, and may have a fourth average width W4 in the second axis direction S2. Herein, the third average width W3 refers to an average of widths of the multilayer film 100 that is placed on a virtual line extended along the first axis direction S1. In addition, the fourth average width W4 refers to an average of widths of the multilayer film 100 that is placed on a virtual line extended along the second axis direction S2.

A width difference between the average widths W3, W4 of the multilayer film 100 in the two or more directions may belong to 0% to 10%. For example, a ratio of the width difference between the third average width W3 and the fourth average width W4 to the third average width W3 may belong to 00% to 10%. In addition, a ratio of the width difference between the third average width W3 and the fourth average width W4 to the fourth average width W4 may belong to 00% to 10%.

In the detailed descriptions, it is illustrated in FIGS. 4 and 5 that the plurality of loops 200 are separate loops which are not connected for convenience of explanation, but this is merely an example, and the plurality of loops 200 may be connected with one another.

Referring back to FIG. 3, when the coil 1 is evenly placed on a plane, the center may be substantially placed on a coil axis (a) which forms a diagonal line angle with the coil 1. For example, the coil axis (a) may form an angle (β) between 30° and 89° with one or more of the main coil surfaces 300, 400 which are planar.

Figure 6:
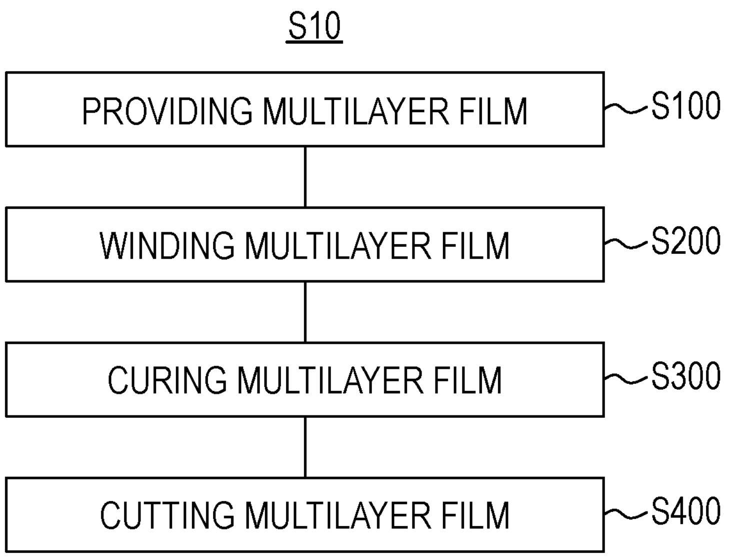
FIG. 6 is a sequence diagram illustrating a method for making a coil in sequence according to the first embodiment of the disclosure.
Figure 7:
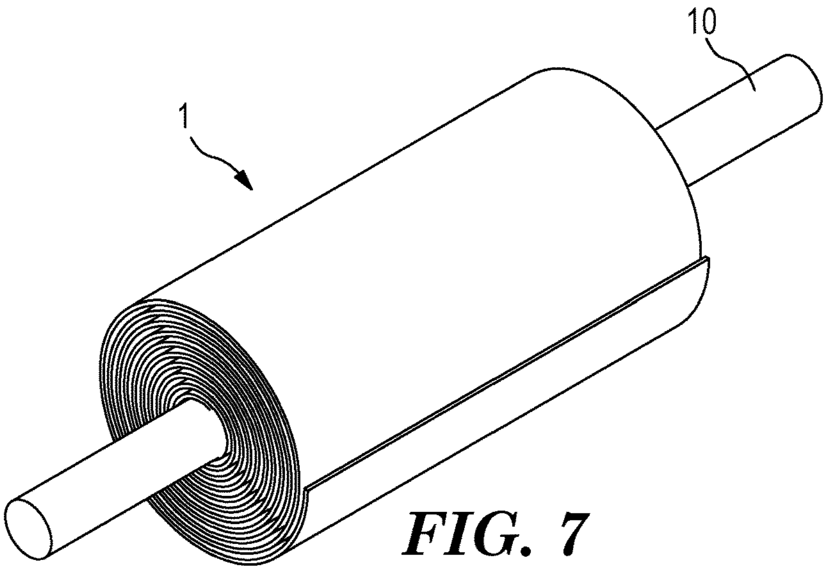
FIG. 7 is a view illustrating a multilayer film wound around a rod according to the first embodiment of the disclosure.
Figure 8:
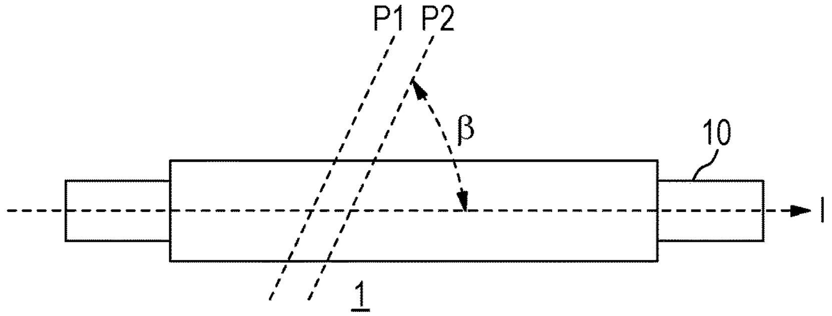
FIG. 8 is a side view of FIG. 7.

Hereinafter, a coil making method (S10) for making the coil 1 according to the first embodiment of the disclosure will be described with reference to FIGS. 6 to 8.

The coil making method (S10) may include a step of providing a multilayer film (S100), a step of winding the multilayer film (S200), a step of curing the multilayer film (S300), and a step of cutting the multilayer film (S400).

At the step of providing the multilayer film (S100), the multilayer film 100 including the plurality of first electro-conductive layers 110 which alternate with each other, and one or more second electrical insulation layers 120 may be provided.

At the step of winding the multilayer film (S200), the multilayer film 100 may be wound with reference to the longitudinal direction axis. In this case, the multilayer film 100 substantially having the center placed on the longitudinal direction axis may include turns which are substantially concentric. In addition, the multilayer film 100 may be wound around an elongated rod 10 which substantially has the center placed on the longitudinal direction axis 1. In the detailed descriptions, the turns mean that the multilayer film 100 is wound around the elongated rod 10 multiple times. In addition, it means that the plurality of turns have the same center. Herein, the elongated rod 10 may have a cross section of a circular or polygonal shape, and may be extended along the longitudinal direction axis 1.

At the step of curing the multilayer film (S300), the multilayer film 100 which is wound multiple times may be cured. At the step of curing the multilayer film (S300), a temperature and a time for curing the multilayer film 100 may vary according to a type of epoxy and a curing agent. For example, at the step of curing the multilayer film (S300), the multilayer film 100 wound around the elongated rod 10 may be cured by being exposed to a high temperature for a predetermined time, and curing may be performed at a room temperature.

At the step of cutting the multilayer film (S400), the multilayer film 100 which is wound multiple times may be cut in an oblique direction to the longitudinal direction axis 1. For example, at the step of cutting the multilayer film (S400), the multilayer film 100 may be cut into one or more pieces along radial planes P1, P2 which form the same diagonal line angle with the longitudinal direction axis 1. The radial planes P1, P2 may be planes that are parallel to each other. In addition, an angle (β) formed by the radial planes P1, P2 with the longitudinal direction axis 1 may be between about 30° and about 89°.

Figure 9:
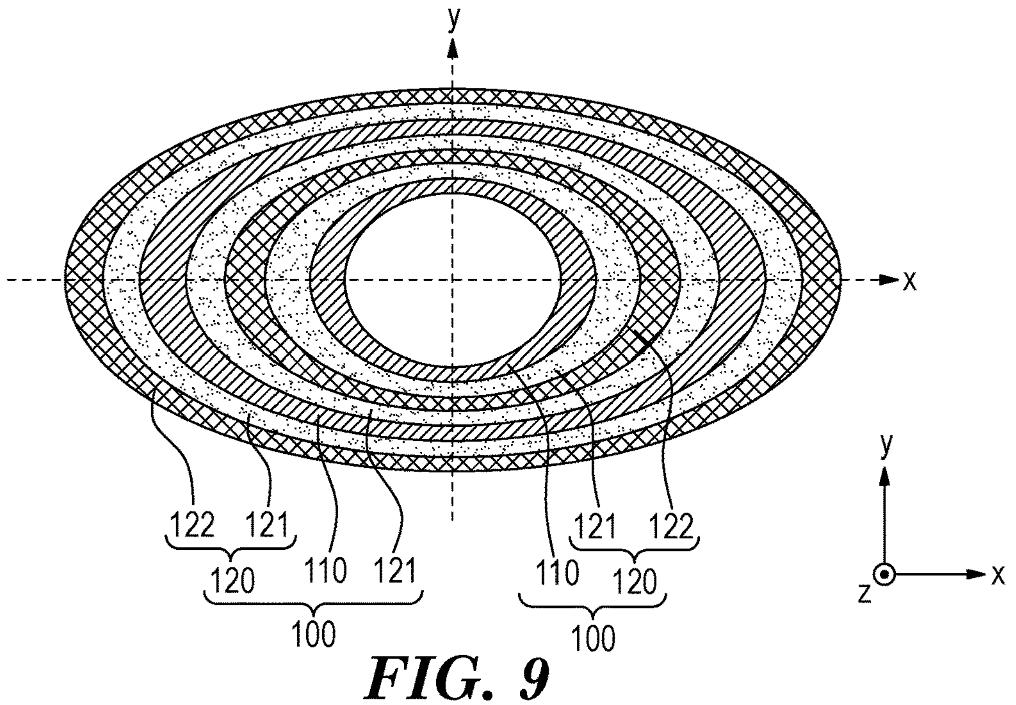
FIG. 9 is a top view of a coil according to a second embodiment of the disclosure.

In addition to the above-described configurations, the second electrical insulation layer 120 according to a second embodiment of the disclosure may include an adhesive layer 121 and a magnetic-conductive layer 122. Hereinafter, the second embodiment of the disclosure will be described by referring more to FIG. 9. In explaining the second embodiment, differences from the above-described embodiment will be highlighted, and, regarding the same explanation and reference numerals, the above-described embodiment is cited.

The second electrical insulation layer 120 may include the adhesive layer 121 and the magnetic-conductive layer 122. For example, one or more of the one or more second electrical insulation layers 120 may be the adhesive layer 121. In addition, one or more of the one or more second electrical insulation layers 120 may be the magnetic-conductive layer 122.

The adhesive layer 121 may connect the first electro-conductive layer 110 and the magnetic-conductive layer 122, and may connect two adjacent first electro-conductive layers 110. In addition, when the multilayer 100 forms the loop 200 which will be described below, the adhesive layer 121 may connect between adjacent loops 200. The adhesive layer 121 may include an adhesive material, and for example, may include epoxy. The adhesive layer 121 may be referred to as a second adhesive layer 121.

The first electro-conductive layer 110 and the adhesive layer 121 may have a length L which is substantially coextensive therebetween along a winding direction of the coil 1, such that the corresponding end surfaces 310, 320, 410, 420 define the main coil surfaces 300, 400 of the coil 1 which are opposite each other and are substantially planar.

In addition, the first electro-magnetic layer 110 and the adhesive layer 121 may have a thickness T which is substantially coextensive therebetween along the winding direction of the coil 1, such that the corresponding end surfaces 310, 320, 410, 420 define the main coil surfaces 300, 400 of the coil 1 which are opposite each other and are substantially planar. In other words, the first electro-conductive layer 110 and the adhesive layer 121 may be extended to have the same thickness T along the thickness direction of the coil 1.

The magnetic-conductive layer 122 may include a material having magnetism. The magnetic-conductive layer 122 may be connected with the first electro-conductive layer 110 through the adhesive layer 121. The magnetic-conductive layer 122 may be provided in plural number. For example, any one of the plurality of magnetic-conductive layers 122 may be disposed between the first electro-conductive layer 110 and the adhesive layer 121. In addition, another one of the plurality of magnetic-conductive layers 122 may be disposed on the outermost area of the multilayer film 100 in the thickness direction. When the multilayer film 100 forms the loop 200, the magnetic-conductive layer 122 disposed on the outermost area of the multilayer film 100 in the thickness direction may be connected with the adhesive layer 121 of an adjacent loop 200. Such a magnetic-conductive layer 122 may be referred to as a third magnetic-conductive layer 122.

For example, the magnetic-conductive layer 122 may include one or more of magnetic-conductive ferrite, a magnetic-conductive soft magnet, magnetic-conductive metal, a magnetic-conductive crystalline alloy, a magnetic-conductive nanocrystalline alloy, a magnetic-conductive amorphous alloy, and a magnetic-conductive composite.

In addition, the magnetic-conductive ferrite included in the magnetic-conductive layer 122 may include one or more of manganese-zinc ferrite and nickel-zinc ferrite.

In addition, the magnetic-conductive soft magnet included in the magnetic-conductive layer 122 may have coercivity of higher than 0 A/m and less than 1000 A/m. For example, the magnetic-conductive soft magnet may have coercivity of less than 1000 A/m or less than 100 A/m or less than 50 A/m or less than 20 A/m.

In other words, the magnetic-conductive soft magnet included in the magnetic-conductive layer 122 may have coercivity of less than 20 A/m or may have coercivity of less than 1000 A/m.

In addition, the magnetic-conductive metal included in the magnetic-conductive layer 122 may include a magnetic-conductive alloy including iron. Herein, the magnetic-conductive alloy may include one or more of silicon, aluminum, boron, niobium, copper, cobalt, nickel and molybdenum.

In addition, the magnetic-conductive crystalline alloy included in the magnetic-conductive layer 122 may include two or more of iron, cobalt, and nickel.

In addition, the magnetic-conductive nanocrystalline alloy included in the magnetic-conductive layer 122 may include iron, silicon, boron, niobium, and copper.

In addition, the magnetic-conductive amorphous alloy included in the magnetic-conductive layer 122 may include one or more of silicon and boron and one or more of cobalt and iron.

In addition, the magnetic-conductive composite included in the magnetic-conductive layer 122 may include particles dispersed in a binder. Herein, the particles dispersed in the binder may include metallic particles, and for example, the metallic particles may include an iron-aluminum-silicon alloy.

The coil 1 according to embodiments of the disclosure may have various shapes and different thicknesses, and the plurality of loops 200 may have different widths in one coil 1. Accordingly, the coil 1 may have a thicker width than a circular coil, and has an effect of a lower alternating current.

In addition, a thick multilayer film 100 for increasing the width of the coil 1 is not wound and the multilayer film 100 having a predetermined thickness is wound and then is cut, so that a process can be simplified.

In addition, since the width of the loop 200 in the coil 1 is adjusted by adjusting an angle for cutting the wound multilayer film 100, there is an effect that the width of the coil 1 may be precisely adjusted.

The following is a list of embodiments of the disclosure.

Item 1 relates to a coil including: main coil surfaces which are opposite each other and are substantially planar; and a multilayer film which is wound to form a plurality of loops which are substantially concentric, wherein the plurality of loops include an innermost loop including a first longitudinal direction end of the coil, and an outermost loop including a second longitudinal direction end of the coil, wherein the multilayer film includes a plurality of first electro-conductive layers which alternate with each other, and one or more second electrical insulation layers, wherein the first electro-conductive layer and the second electrical insulation layer have a length which is substantially coextensive therebetween along a winding direction of the coil, and have a thickness which is substantially coextensive along a thickness direction of the coil, such that the main coil surfaces, which are substantially planar, include corresponding end surfaces of the first electro-conductive layer and the second electrical insulation layer, respectively, wherein the multilayer film has respective average widths W1, W2 along a first in-plane direction and a second in-plane direction of one or more of the main coil surfaces which are planar, wherein the first in-plane direction and the second in-plane direction have an angle of 90° therebetween, wherein 11.47≥W1/W2≥1.02.

Item 2 relates to the coil, wherein a ratio of the average width W1 of the multilayer film in the first in-plane direction to the average width W2 of the multilayer film in the second in-plane direction (W1/W2) is 1.02-11.47 inclusive.

Item 3 relates to the coil, where the main coil surfaces which are substantially planar form an angle of 0° to 10° inclusive therebetween.

Item 4 relates to the coil, wherein the coil has an oval shape when viewed from an upper side.

Item 5 relates to the coil, wherein the coil has a parallelogrammic shape when viewed from a side surface.

Item 6 relates to the coil, wherein the multilayer film has average widths along two or more directions which form an angle of 20° to 160° inclusive therebetween, and wherein a width difference between the average widths in the two or more directions belongs to 0% to 10%.

Item 7 relates to the coil, wherein an angle between the two or more directions is between about 85° and about 95°.

Item 8 relates to the coil, wherein one or more of the one or more second electrical insulation layers are adhesive layers.

Item 9 relates to the coil, wherein at least one of the one or more second electrical insulation layers is a magnetic-conductive layer.

Item 10 relates to the coil, wherein the magnetic-conductive layer includes one or more of magnetic-conductive ferrite, a magnetic-conductive soft magnet, magnetic-conductive metal, a magnetic-conductive crystalline alloy, a magnetic-conductive nanocrystalline alloy, a magnetic-conductive amorphous alloy, and a magnetic-conductive composite.

Item 11 relates to the coil, wherein the magnetic-conductive ferrite includes one or more of manganese-zinc ferrite and nickel-zinc ferrite.

Item 12 relates to the coil, wherein the magnetic-conductive soft magnet has coercivity of higher than 0 A/m and less than 1000 A/m.

Item 13 relates to the coil, wherein the magnetic-conductive metal includes a magnetic-conductive alloy including iron.

Item 14 relates to the coil, wherein the magnetic-conductive alloy further includes one or more of silicon, aluminum, boron, niobium, copper, cobalt, nickel and molybdenum.

Item 15 relates to the coil, wherein the magnetic-conductive alloy further includes one or more of silicon, boron, niobium, and copper.

Item 16 relates to the coil, wherein the magnetic-conductive crystalline alloy includes two or more of iron, cobalt, and nickel.

Item 17 relates to the coil, wherein the magnetic-conductive nanocrystalline alloy includes iron, silicon, boron, niobium, and copper.

Item 18 relates to the coil, wherein the magnetic-conductive amorphous alloy includes one or more of silicon and boron and one or more of cobalt and iron.

Item 19 relates to the coil, wherein the magnetic-conductive composite includes particles dispersed in a binder.

Item 20 relates to the coil, wherein the particles include metallic particles.

Item 21 relates to the coil, wherein the metallic particles include an iron-aluminum-silicon alloy.

Item 22 relates to the coil, where one or more of the one or more second electrical insulation layers include an adhesive layer and an electro-magnetic layer disposed on the adhesive layer.

Item 23 relates to the coil, wherein the first electro-conductive layer is magnetically insulative.

Item 24 relates to the coil, wherein the first electro-conductive layer includes metal.

Item 25 relates to a coil including a multilayer film which is wound to form a plurality of loops which are substantially concentric, wherein the multilayer film includes a plurality of first electro-conductive layers which are spaced apart from one another in a thickness direction of the multilayer film, and a second adhesive layer, wherein two or more adjacent first electro-conductive layers are spaced apart from each other by the second adhesive layer, wherein the first electro-conductive layer and the second adhesive layer have a length which is substantially coextensive therebetween along a winding direction of the coil, and have a width which is substantially coextensive along a thickness direction of the coil, such that corresponding end surfaces of the first electro-conductive layer and the second adhesive layer define main coil surfaces of the coil which are opposite each other and are substantially planar, wherein, when the coil is evenly placed, the coil has a center substantially placed on a coil axis which forms an angle between 30° and 89° with one or more of the main coil surfaces which are planar.

Item 26 relates to the coil further including a third magnetic-conductive layer, wherein the one or more first electro-conductive layer is disposed on the third magnetic-conductive layer.

Item 27 relates to a coil including top and bottom main coil surfaces which are opposite each other and are substantially planar, and a plurality of loops which are substantially concentric, wherein each of the loops includes one or more first electro-conductive layer and one or more second adhesive layer, wherein, when the coil is evenly placed, the coil has a center substantially placed on a coil axis which forms a diagonal line angle with the coil.

Item 28 relates to a planar coil including top and bottom main coil surfaces which are opposite each other and are substantially planar, and a plurality of loops which are substantially concentric, wherein the top and bottom main coil surfaces are perpendicular to the coil, and are offset by each other, such that the coil has a parallelogrammic shape on a cross section of the coil within a plane including a first in-plane direction.

Item 29 relates to the planar coil, wherein two adjacent surfaces of the parallelogram form an angle between about 10° and about 60°.

Item 30 relates to a method for making a coil, the method including: a step of providing a multilayer film which includes a plurality of first electro-conductive layers which alternate with each other, and one or more second electrical insulation layers; a step of winding the multilayer film with respect to a longitudinal direction axis in order to form a wound multilayer film including a plurality of turns which are substantially concentric, the multilayer film substantially having a center placed on the longitudinal direction axis; and a step of cutting the wound multilayer film into one or more pieces along radial planes in order to form the coil, the radial planes being parallel to each other and forming a same diagonal line angle with respect to the longitudinal direction axis.

Item 31 relates to the method, wherein the diagonal line angle is between about 30° and about 89°.

Although embodiments of the disclosure have been described in the form of specific embodiments, these are merely examples and the disclosure is not limited thereto, and should be interpreted as having the widest scope of the technical concept disclosed in the specification. An ordinary skilled person in the related art may embody a pattern of a shape that is not set forth herein by combining/substituting the disclosed embodiments, without departing from the scope of the disclosure. In addition, an ordinary skilled person in the related art may easily change or modify the disclosed embodiments based on the detailed descriptions, and it is obvious that the changes or modifications belong to the right scope of the disclosure.

DESCRIPTION OF REFERENCE NUMERALS

1: coil
100: multilayer film
120: second electrical insulation layer
122: magnetic-conductive layer
210: innermost loop
220: outermost loop
300: first main coil surface
320: first electrical insulation layer end surface
410: second electro-conductive layer end surface
10: rod
110: first electro-conductive layer
121: adhesive layer
200: loop
211: first longitudinal direction end
221: second longitudinal direction end
310: first electro-conductive layer end surface
400: second main coil surface
420: second electrical insulation layer end surface

What is claimed is:

1. A coil comprising:

main coil surfaces which are opposite each other and are substantially planar; and a multilayer film which is wound to form a plurality of loops which are substantially concentric, wherein the plurality of loops comprise an innermost loop comprising a first longitudinal direction end of the coil, and an outermost loop comprising a second longitudinal direction end of the coil, wherein the multilayer film comprises a plurality of first electro-conductive layers which alternate with each other, and one or more second electrical insulation layers, wherein the first electro-conductive layer and the second electrical insulation layer have a length which is substantially coextensive therebetween along a winding direction of the coil, and have a thickness which is substantially coextensive along a thickness direction of the coil, such that the main coil surfaces, which are substantially planar, comprise corresponding end surfaces of the first electro-conductive layer and the second electrical insulation layer, respectively, wherein the multilayer film has respective average widths W1, W2 along a first in-plane direction and a second in-plane direction of one or more of the main coil surfaces which are planar, wherein the multilayer film has average widths W3, W4 along two or more directions which form an angle of 20° to 160° inclusive therebetween, and wherein a width difference between the average widths in the two or more directions belongs to 0% to 10%, wherein the first in-plane direction and the second in-plane direction have an angle of 90° therebetween, wherein $11.47 \geq W1/W2 \geq 1.02$.

2. The coil of claim 1, wherein a ratio of the average width W1 of the multilayer film in the first in-plane direction to the average width W2 of the multilayer film in the second in-plane direction (W1/W2) is 1.02-11.47 inclusive.

3. The coil of claim 1, wherein the main coil surfaces which are substantially planar form an angle of 0° to 10° inclusive therebetween.

4. The coil of claim 1, wherein the coil has a parallelogrammic shape when viewed from a side surface.

5. The coil of claim 1, wherein an angle between the two or more directions is between about 85° and about 95°.

6. The coil of claim 1, wherein one or more of the one or more second electrical insulation layers are adhesive layers.

7. The coil of claim 1, wherein at least one of the one or more second electrical insulation layers is a magnetic-conductive layer.

8. The coil of claim 7, wherein the magnetic-conductive layer comprises one or more of magnetic-conductive ferrite, a magnetic-conductive soft magnet, magnetic-conductive metal, a magnetic-conductive crystalline alloy, a magnetic-conductive nanocrystalline alloy, a magnetic-conductive amorphous alloy, and a magnetic-conductive composite.

9. The coil of claim 8, wherein the magnetic-conductive ferrite comprises one or more of manganese-zinc ferrite and nickel-zinc ferrite.

10. The coil of claim 8, wherein the magnetic-conductive metal comprises a magnetic-conductive alloy comprising iron.

11. The coil of claim 10, wherein the magnetic-conductive alloy further comprises one or more of silicon, aluminum, boron, niobium, copper, cobalt, nickel and molybdenum.

12. The coil of claim 10, wherein the magnetic-conductive alloy further comprises one or more of silicon, boron, niobium, and copper.

13. The coil of claim 8, wherein the magnetic-conductive crystalline alloy comprises two or more of iron, cobalt, and nickel.

14. The coil of claim 8, wherein the magnetic-conductive nanocrystalline alloy comprises iron, silicon, boron, niobium, and copper.

15. The coil of claim 1, wherein one or more of the one or more second electrical insulation layers comprise an adhesive layer and an electro-magnetic layer disposed on the adhesive layer.

16. The coil of claim 1, wherein the first electro-conductive layer is magnetically insulative.

* * * * *